Aug. 15, 1961  R. H. WISE  2,996,081
MULTIPLE VALVE STRUCTURE
Filed June 29, 1956  3 Sheets-Sheet 1

INVENTOR.
RALPH H. WISE
BY Charles S. Penfold
ATTORNEY

Aug. 15, 1961  R. H. WISE  2,996,081
MULTIPLE VALVE STRUCTURE
Filed June 29, 1956  3 Sheets-Sheet 2

INVENTOR.
RALPH H. WISE
BY
Charles S. Penfold
ATTORNEY

Aug. 15, 1961 R. H. WISE 2,996,081
MULTIPLE VALVE STRUCTURE
Filed June 29, 1956 3 Sheets-Sheet 3

INVENTOR.
RALPH H. WISE
BY
Charles S. Penfold
ATTORNEY

United States Patent Office 2,996,081
Patented Aug. 15, 1961

2,996,081
MULTIPLE VALVE STRUCTURE
Ralph H. Wise, Gary, Ind., assignor, by mesne assignments, to The Anderson Company, a corporation of Indiana
Filed June 29, 1956, Ser. No. 594,789
11 Claims. (Cl. 137—624)

The invention relates generally to a system or apparatus for controlling a fluid to operate a device and more particularly is directed to a multivalve assembly for this purpose.

The assembly embodying the invention may be utilized wherever applicable, but as disclosed herein is employed in an automotive vehicle whereby various instrumentalities or devices thereon can be selectively or jointly operated.

More specifically in this regard, and as one of many applications, the assembly is adapted to be mounted on or adjacent an instrument panel for controlling, through a fluid, the movement of responsive means which, in turn, may serve to operate devices such as a vent, heater or defroster on the vehicle. The invention may also be employed to operate other instrumentalities, such as a release for a hood, deck or door lock.

With the foregoing in mind, an important object of the invention is to provide an assembly which derives or obtains its power from a single source, such as a conventional vacuum hookup with an engine manifold, as distinguished from employing a separate power means for each device to be operated.

A significant object of the invention is to provide a control assembly which is relatively small and compact to facilitate installation and selection of a desirable location on the instrument panel or other mounting for convenience in manipulation, as distinguished from a setup having individual controls disposed remote from one another at locations which are awkward to reach.

Another object of the invention is to provide an assembly comprising, among other things, a valve body or housing provided with a plurality of valve seats, passages communicating with the seats, a pair of tubes or conduits for connecting certain passages with each responsive means, and valves whereby either of each pair of conduits can be selectively connected with the vacuum or power source to control the operation of each of the devices above referred to.

Another object of the invention is to provide a valve body with a plurality of guide means, manually operated actuators respectively arranged in the guide means for actuating the valves, including means for normally urging the actuators toward predetermined or outer positions to influence the responsive means to operate the devices certain ways, and means for automatically detaining the actuators in other predetermined or inner positions, when manually moved to such inner positions, to influence the responsive means to operate the devices in different ways. In other words, movement of any one of the actuators to one position will correspondingly move a valve to cause the fluid to flow through certain passages and one tube to initiate actuation of a responsive means to produce an operation, such as opening a vent, and movement of the actuator to another position will similarly cause fluid to flow through certain passages and the other tube to effect actuation of the responsive means to produce another operation, such as closing the vent. Thus, the organization affords a setup whereby a valve can be manipulated to connect the vacuum or power source with a responsive means in either of two ways to influence the operation of a device.

An additional object of the invention is to provide a unique latching mechanism whereby each actuator can be held in an operative position until released.

Also, an object of the invention is to provide a valve assembly having three actuators which are mechanically operatively connected in a manner whereby movement of one actuator toward an inner position will result in operating a device and also effect release of either or both of the other actuators if same have been previously locked in their inner positions. Provision is also made whereby, if two of the actuators are simultaneously moved to inner locked positions, movement of the third actuator will operate a device and effect release of the two actuators.

A specific object of the invention is to provide a master control for effecting the release of one or all of the actuators back to their respective outer positions. The master control is so constructed that it is continuously urged to an outer position and cannot be locked in any position.

A further object of the invention is to provide an assembly in which the valves are of the rotary type and constructed of some desirable resilient material, such as neoprene, including a cover which serves to hold all of the valves and actuators in their respective positions on the seats and in the guides.

Another object of the invention is to provide a valve body which is preferably cast or moulded with the passages leading to ports in the seats and intersecting the under surface of the body, and a bottom plate which is secured in sealed relationship to the underside of the body to cover all of the passages. Moulding the passages in the body and providing a cover and a plate has proven practical, efficient and inexpensive.

A further object of the invention is to provide an assembly with a switch means which is actuated by certain actuators to operate a signal such as a telltale to indicate the condition of a responsive means.

Additional objects of the invention reside in providing an assembly which offers advantages with respect to efficiency, durability, standardization of certain components, installation and costs of manufacture as compared to conventional installations now in use which require separate sources to operate various devices.

Other objects and advantages of the invention will become apparent after the description hereinafter set forth is considered in conjunction with the drawings annexed hereto.

Figure 1:
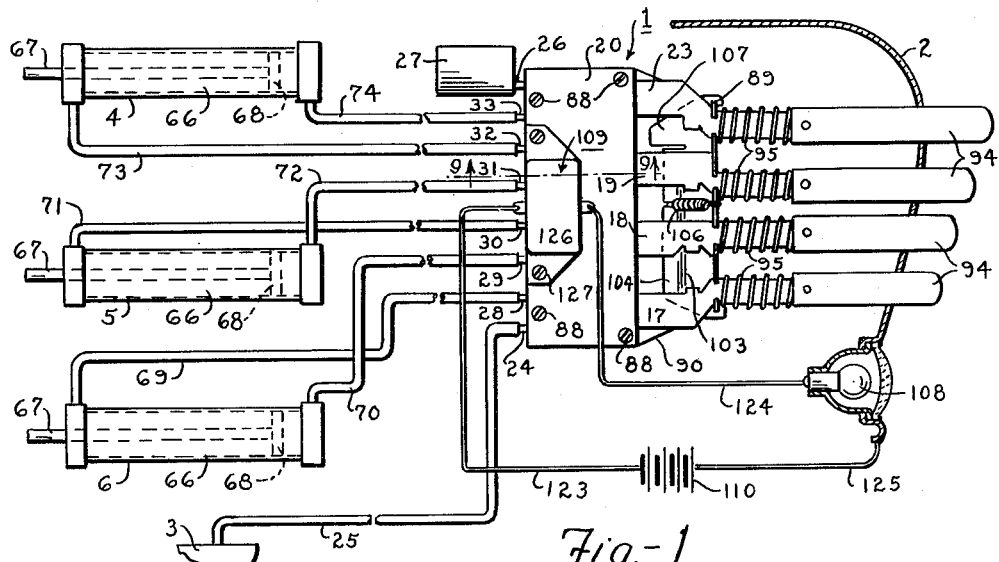
FIGURE 1 is a view exemplifying the assembly operatively connected with a source of supply and the responsive means.

As above referred to, the assembly embodying the invention may be utilized where desired, but, as exemplified in FIGURE 1 of the drawings, it is generally designated 1 and shown mounted on an instrument panel 2 of an automotive vehicle for convenient manipulation. The assembly serves to operatively connect an engine manifold 3 for obtaining vacuum power with responsive means 4, 5 and 6 which may be utilized to operate any of the devices above referred to.

Figure 2:
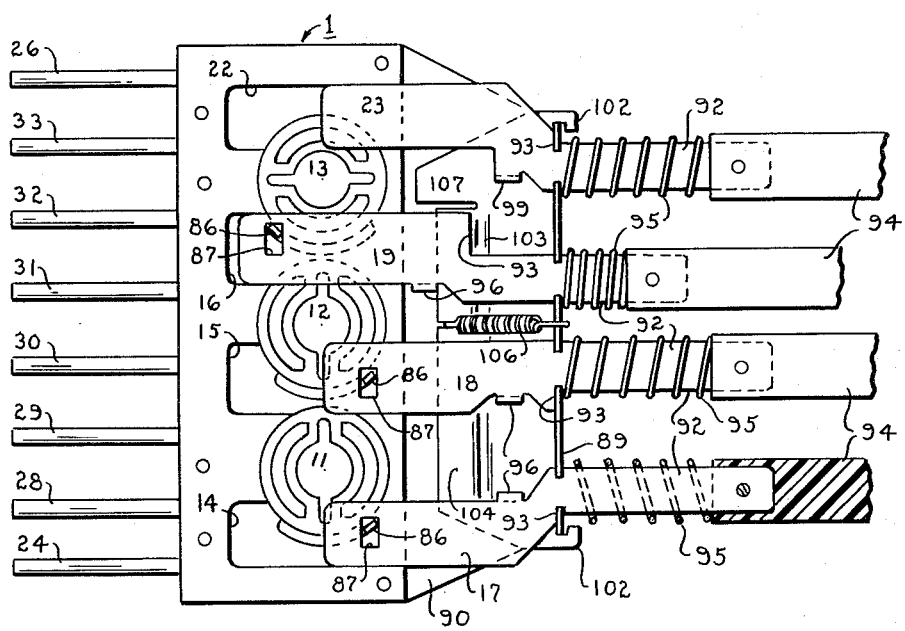
FIGURE 2 is a top view of the assembly with the cover thereof and switch means removed to show the operative relationship of the valves and actuators and the means employed to detain the actuators in operative positions.
Figures 4, 5:
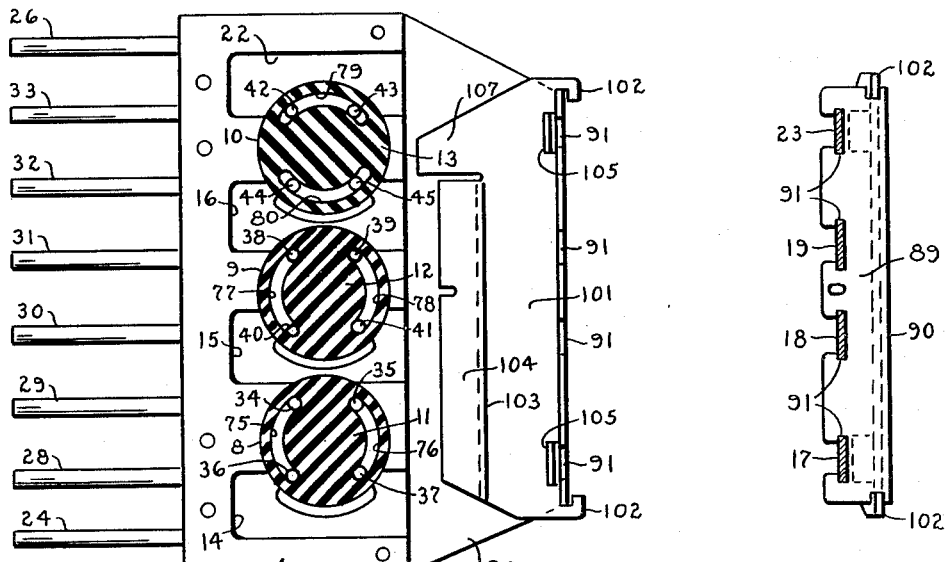
FIGURE 4 is a top view of the assembly with certain components removed to illustrate the character of the valves and latching mechanism.
FIGURE 5 is an end view of an extension of the bottom wall of the assembly showing the manner in which the actuators are slidably supported on the extension.
Figure 6:
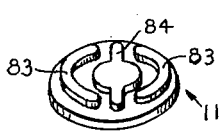
FIGURES 6 and 7 are perspective views showing details of the top and bottom of each valve.
Figure 9:
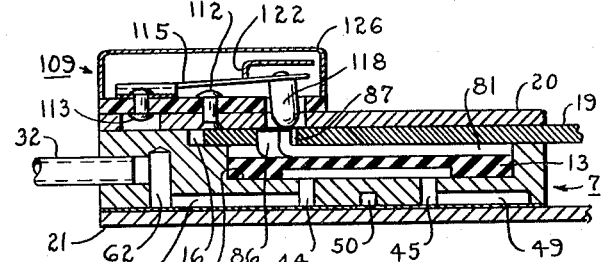
FIGURE 9 is a transverse section taken substantially on line 9—9 of FIGURE 1 to illustrate the character of certain of the passages and their relationship to the valve seats and certain structural details of the switch means.
Figure 12:
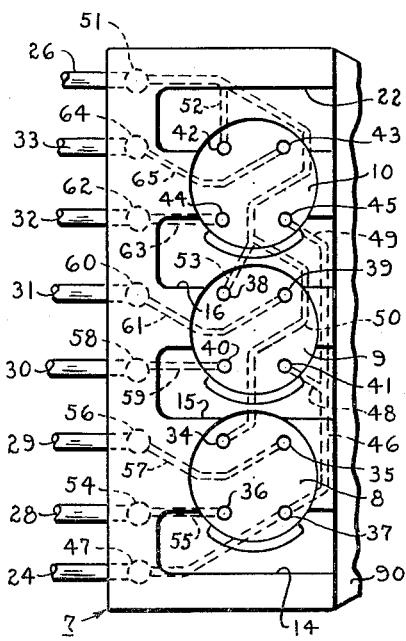
FIGURE 12 is a top view of the valve body showing the structural characteristics of the valve seats, passages and ports.

The assembly may be designed and constructed in various ways, but as shown includes, among other things, a moulded or die-cast elongate body or housing generally designated 7 provided with three corresponding inset circular flat seats 8, 9 and 10 as depicted in FIGURES 4 and 12; circular valves 11, 12 and 13, respectively bearing on the seats as shown in FIGURE 4; corresponding guides 14, 15 and 16 in the form of transverse recesses or grooves as shown in FIGURES 2, 4 and 12; manual actuators 17, 18 and 19 slidably mounted in the guide slots; a top cover 20 overlying and holding all of the valves and actuators in position for actuation as best illustrated in FIGURES 1 and 9; and a bottom plate 21 secured in sealed relationship to the underside of the body by a gasket of soft material. The valve body is also provided with a plurality of passages, ports and other components which will be described more in detail subsequently.

Figure 3:
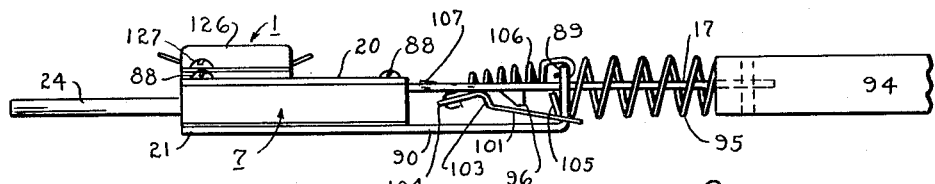
FIGURE 3 is a side elevational view of the assembly.

The body is preferably generally rectangular in shape and relatively thin with upper and lower substantially parallel surfaces, the upper surface being provided with the seats and guide slots above referred to. The seats are preferably centrally located and equally spaced apart lengthwise of the body. The slots forming the guides are disposed in parallel relation and transversely to the longitudinal axis of the body and generally tangent to the seats. The upper side of the body is also provided with a transverse guide slot 22 adjacent one extremity thereof and receives a master actuator or manual control 23 which is held in place by the cover 20. The slots are preferably of a predetermined depth so that the actuators when seated therein are flush with the upper surface of the valve body as illustrated in FIGURES 3 and 9.

Any means suitable for the purpose may be employed to operatively connect the valve assembly 1 to the vacuum source 3, but as shown this is preferably accomplished in part by tubes carried by and arranged in parallel relationship on the body 7 of the assembly. More particularly in this regard, one edge of the valve body is provided with a plurality of recesses within which the inner ends of the tubes are secured. A tube 24 at one extremity of the body is connected to the manifold 3 by a conduit 25 and a tube 26 at the other extremity of the body communicates with the atmosphere through a filter-silencer 27 carried by the tube 26. A pair of tubes 28 and 29 are located adjacent the valve seat 8 as shown in FIGURE 4; a pair of tubes 30 and 31 adjacent the seat 9; and a pair of tubes 32 and 33 adjacent the seat 10. The seat 8 is provided with four vertical ports 34, 35, 36 and 37; the seat 9 with four vertical ports 38, 39, 40 and 41; and seat 10 with four vertical ports 42, 43, 44 and 45. The ports in the seats substantially correspond in size and arrangement. Thus, it will be noted that the ports in seat 8 are circumferentially arranged and that the ports 34 and 37 are diametrically disposed and that ports 35 and 36 are similarly disposed, the same being true of the corresponding pairs of ports in seats 9 and 10.

The character of the valve body as shown in FIGURE 12 is unique in that its underside is provided with a generally longitudinally extending horizontal primary passage or trunk line 46 which is communicatively connected to the port 37 in the seat 8 and also with the tube 24 by a vertical passage 47 in the body. The ports 41 and 45 in seats 9 and 10 are also respectively communicatively connected to the main line 46 by horizontal passages 48 and 49. Thus, all of the ports 37, 41 and 45 are connected to the source of power 3.

The underside of the valve body is also provided with a second longitudinally extending horizontal primary passage or trunk line 50 which communicates with the vent tube 26 through a vertical passage 51 in the body. This trunk line communicating with the atmosphere is also communicatively connected to the vertical port 34 in the seat 8 and respectively to the ports 38 and 42 in seats 9 and 10, by horizontal lateral passages 52 and 53, thereby connecting all of these ports with the atmosphere through the tube 26 and filter 27 which maintains the fluid clean and silences the admission of air into the valve body. Thus one port in each of the valve seats is connected with the power source and another port in each seat is connected with the atmosphere.

The tube 28 is communicatively connected (FIGURE 12) to the port 36 in the seat 8 by a vertical passage 54 and a horizontal passage 55 and the tube 29 to port 35 by a vertical passage 56 and a horizontal passage 57, and the pairs of tubes 30, 31 and 32, and 33 are similarly connected with ports in the seats 9 and 10. More specifically in this regard, the tube 30 is communicatively connected to the port 40 by a vertical passage 58 and a horizontal passage 59 and tube 31 to port 39 by a vertical passage 60 and a horizontal passage 61. The tube 32 is communicatively connected to the port 44 in the seat 10 by a vertical passage 62 and a horizontal passage 63 and the tube 33 to the port 43 by a vertical passage 64 and a horizontal passage 65. Providing a single relatively thin valve body with the seats, ports and passages just described is unique and has proven very practical and efficient in use as same can be moulded in one operation to materially reduce the cost of manufacture.

The responsive means 4, 5 and 6 which are respectively under the control of the valves 13, 12 and 11, may be designed and constructed as desired, but as exemplified in FIGURE 1 of the drawings, they are identical and each includes a cylinder 66 having a rod 67 and a piston 68 reciprocable therein. The rods may be respectively operatively associated with the devices above referred to, or other devices adapted to be operated.

The responsive means are communicatively connected to the valve assembly by a plurality of conduits or pipes. More particularly in this regard, the pair of tubes 28 and 29 related to the valve 11 are respectively connected to the opposite ends of the cylinder of the responsive means 6 by a pair of conduits 69 and 70; the pair of tubes 30 and 31 related to valve 12 to the opposite ends of the cylinder of responsive means 5 by a pair of conduits 71 and 72; and the pair of tubes 32 and 33 related to valve 13 to the ends of the cylinder of responsive means 4 by conduits 73 and 74. The arrangement is such that a pair of conduits are attached to each cylinder on opposite sides of a piston so that when fluid is sucked or withdrawn from one end of a cylinder and is vented at its other end the piston will move toward said one end for operating a device in a certain way and when the flow of fluid is reversed by a valve the piston will move toward the opposite end of the cylinder to operate the device another way, all of which will be explained more in detail subsequently after the valves, actuators, latch and release therefor are described.

Figure 7:
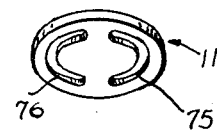

The valves correspond in size and shape to promote standardization and each includes a channeled rotor distributor or valve disk which is preferably made circular and relatively flat and is constructed from some desirable resilient material such as neoprene. More particularly, and as shown in FIGURES 4 and 7, the underside of the valve disk 11 is provided with a pair of corresponding circumferentially disposed arcuate recesses 75 and 76 and the valve disks 12 and 13 with pairs of similar recesses 77, 78 and 79, 80, respectively.

Figure 8:
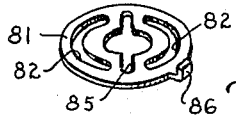
FIGURE 8 is a perspective view of a connector adapted for interconnecting each valve with an actuator.

A connector 81, as shown in FIGURES 2 and 8, is attached to each of the valve disks and each connector is preferably made in the form of a circular flat plate having a pair of arcuate slots 82 therein which receive arcuate bosses 83 provided on the upper side of each of the valves for interconnecting the plate and valve disk. The bosses also serve to impart strength to each valve disk and afford additional material for the formation of the recesses. The upper part of each valve disk is also provided with a central oblong boss 84 which is received in a central slot 85 in a plate to further strengthen and stabilize the valve disk and the connection between the plate and valve disk. It will be noted that the thickness of each connector substantially corresponds to the height of the bosses so that the upper surface of the connector is flush with the upper surfaces of the bosses and that these surfaces are also flush with the bottom surfaces of the guide slots for the actuators.

Each of the connectors is provided with a radial projection having an upturned finger 86 which registers with an opening 87 provided in the inner end of each of the actuators 17, 18 and 19 as shown in FIGURES 2, 8 and 9 to afford driving connections between the actuators and valves so that reciprocation of the actuators will rotate the valves. It will be noted that clearance recesses are provided in the valve body for the radial projections.

The actuators and the manner in which same are mounted on the valve body and supported on the bottom plate thereof, including the latch mechanism, will now be described. The guide slots in which the actuators are slidable are disposed on a level above the seats and arranged whereby the actuators will respectively overlie the connectors and valves and be flush with the upper surface of the valve body so that the cover 20 will bear against the upper surface of the body and retain the valves in place for rotary movement and the actuators for reciprocatory movement. It will be noted that the actuator 17 overlies the valve 11; that actuator 18 overlies the valves 11 and 12; that the actuator 19 overlies the valves 12 and 13; and that the master actuator 23 overlies the valve 13. Any suitable fastening means, such as screws 88, can be used to secure the cover in place.

The actuators are all additionally supported on an upturned flange 89 formed on an extension 90 of the bottom plate 21 of the valve assembly. More particularly in this respect the flange is provided with a plurality of corresponding T-notches 91 which lock the actuators for slidable movement therein as shown in FIGURES 2 and 5.

Each actuator is preferably made to include an inner relatively wide flat extremity which slides in a guide slot provided in the valve body 7 and an outer reduced extremity 92 which slides in a T-notch and forms a shoulder or stop 93. An elongate knob 94 is secured to the outer end of each reduced extremity for extension through the instrument panel 2 as depicted in FIGURE 1 and a helical spring 95 surrounds each reduced extremity between the flange 89 and a knob to normally urge each actuator outwardly so that the stop 93 thereon will abut the flange. The actuators and/or knobs may be fashioned as desired, but as illustrated all of the actuators are of the same length whereas the knobs vary in length to present a pleasing appearance. It will be noted that certain of the reduced extremities are offset to place them closer together so that the knobs will occupy a smaller area at the front of the panel. Each of the actuators 17, 18 and 19 is provided with a downwardly extending projection 96 having a cam edge 97 and an abutment 98 and the actuator 23 with a downturned projection 99 having a cam edge 100, the purpose of which will be explained subsequently.

Figure 13:
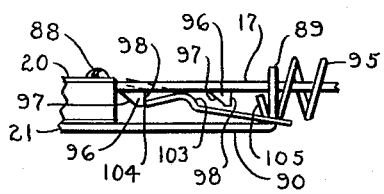
FIGURES 13 and 14 are partial elevational views showing the latch and release mechanisms for the actuators and master control.
Figure 14:
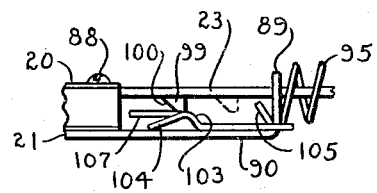

Any suitable means may be employed to temporarily selectively lock certain of the actuators in operative positions. As clearly illustrated in FIGURES 2, 3, 4, 5, 13 and 14, a novel latch mechanism is utilized for this purpose. More specifically in this regard, an elongate latch member 101, common to all of the actuators, is interposed between the extension 90 of the bottom plate 21 and the actuators. This latch is provided with hooks 102 at its ends which embrace the ends of the flange 89 so that when the actuators are threaded through the T-notches 91 the latch will be locked in place for pivotal or tilting movement. The latch is also provided with an upturned inclined portion forming a cam surface 103 and a downturned inclined portion having a marginal edge 104. The latch is further provided with a pair of upturned lugs 105 which are of a length so they may engage the actuators 17 and 23 to maintain the forward edge of the latch adjacent the junction between the extension 90 and flange 89, as evidenced in FIGURES 4 and 13, so the latch will be held in a proper relationship to the extension to be tilted. The marginal edge 104 of the latch is provided with a notch and the flange 89 with a hole and a helical spring 106 has its ends connected in the notch and hole for normally urging the cam 103 of the latch upwardly against the actuators.

All of the actuators are operatively related to the latch in such a way that the latch is depressed when any one or all of the actuators are manually pushed inwardly. More specifically in this respect, when the actuator 17, for example, is pushed inwardly the cam edge 97 thereon will engage and ride over the cam surface 103 to tilt the latch and then move down on the latch until the abutment 98 on the actuator clears the edge 104 so that the spring 106 will snap the latch upwardly to cause the edge 104 to engage the abutment 98 and thereby lock the actuator in place.

The continuous inward movement of the actuator 17 causes rotation of the valve 11 to control the flow of fluid between the source 3 and the responsive means 6. The arrangement is such that when any one of the actuators 17, 18 and 19 is pushed inwardly it will be held by the latch and the same holding action will result if two or all three of these actuators are simultaneously pushed inwardly, but if any one or two are locked the inward movement of the third will release the others. Thus, if the actuator 19 is moved to the locked position shown in FIGURE 2, and either of the other actuators or both are simultaneously later moved inwardly, the actuator 19 will be released by the latch to permit this actuator to move outwardly under the influence of a spring 95. If any two actuators have been moved inwardly to locking positions, later inward movement of the third to a locked position will release the two. With this setup the three actuators 17, 18 and 19 can be readily locked and unlocked by their manipulation. If, however, all three are simultaneously moved inwardly to locked positions they cannot be released except by the master control or actuator 23. If the actuators 17, 18 and 19 are locked, the master control 23 will effect their release because when the control 23 is moved inwardly the cam edge 100 on the projection 99 will engage the cam surface 103 on the latch and push it downwardly and thereby disengage its edge 104 from the abutments 98 on the projections 96 carried by the actuators 17, 18 and 19. The control 23 cannot be locked in any position because the projection 99 thereon will bear only on a rest portion 107 provided on the latch when moved beyond the cam surface 103 on the latch. This control can also be used to effect release of any one or all of the actuators 17, 18 and 19.

In view of the foregoing, it will be manifest that the operation of the system is relatively simple. For example, when FIGURES 1, 4 and 12 are viewed and all of the valves are in the position of valve 11, the vacuum means 3 will cause the pistons 68 in the cylinders of all of the responsive means to move to the right as shown and stay in these positions, while venting the cylinders 66 on the opposite sides of the pistons to the atmosphere. These movements of a piston, for example, may be utilized to render a device operatively associated with any piston and in an inoperative position. Thus, the piston rod of the responsive means 6 may be connected to a vent for maintaining the vent in a closed or inoperative position, and the other rods can be connected to other devices.

More particularly, when the valve 11 is in the position shown in FIGURE 4, fluid will be sucked from the right side of the cylinder 66 to the vacuum means 3, through conduit 70, tube 29, passages 56 and 57, port 35, arcuate recess 76 in valve 11, port 37, primary passage 46, passage 47, tube 24 and back to the source 3 through conduit 25; and the cylinder at the left of the piston is vented to the atmosphere through conduit 69, tube 28, passages 54 and 55, port 36, arcuate recess 75 in the valve, port 34, primary passage 50 and passage 51 to the vent tube 26 and filter 27. When one desires to open the vent connected to the piston rod of the responsive means 6, for example, it is only necessary to push in on the actuator 17 to cause rotation of the valve 11, like the valve 13 shown in FIGURES 2 and 4, so that its arcuate recess 76 bridges the ports 36 and 37 and arcuate recess 75 bridges ports 34 and 35 so that the vacuum will cause the piston to move to the left while venting the cylinder at its right end. More specifically in this regard, when the valve is rotated as aforesaid, fluid will be withdrawn from the left end of the cylinder to the vacuum means 3, through conduit 69, tube 28, passages 54 and 55, port 36, arcuate recess 76 in the valve, port 37, primary passage 46 and passage 47, tube 24 and to the means 3 through conduit 25, while venting the right end of the cylinder through conduit 70, tube 29, passages 56 and 57, port 35, arcuate recess 75 in the valve, port 34, primary passage 50 and to the vent tube 26 through passage 51. Accordingly, it is apparent that the other valves 12 and 13 can be also operated in the same manner as valve 11 to respectively effect actuation of the responsive means 5 and 4 to operate any suitable devices associated with the piston rods of these responsive means. It is to be understood that, insofar as the subject invention is concerned, a responsive means may be designed and constructed in such a manner that the fluid will produce a progressive movement in one direction to influence the movement or operation of a device and not a return or reciprocating movement, in which event movement of the responsive means in the opposite direction may be effected by a spring or other means.

Figure 10:
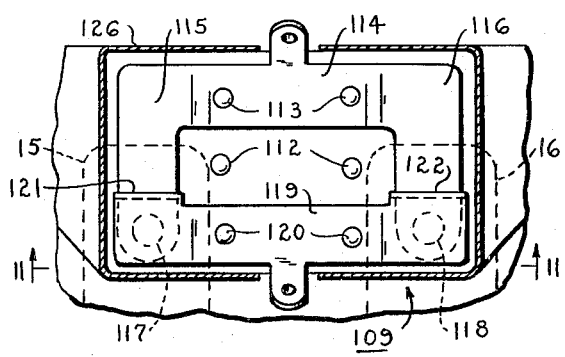
FIGURE 10 is a partial top view of the assembly with a portion removed to show details of the switch means.

As alluded to above, switch means are preferably employed to operate a signal to indicate the condition of certain of the responsive means. The setup illustrated includes an electric lamp constituting a telltale 108 carried by the instrument panel as shown in FIGURE 1, a switch means generally designated 109, as exemplified in FIGURES 9, 10 and 11, and a source of power, such as a battery 110.

More particularly, the switch means comprises an insulator 111 secured to the cover 20 by a pair of rivets 112. A generally U-shaped member is fastened to the upper side of the insulator by rivets 113. This member has a bridge portion 114 through which the rivets 113 project and a pair of offset parallel yieldable legs 115 and 116 disposed in spaced relationship to the insulator. The free ends of the legs are provided with non-metallic buttons 117 and 118 which normally extend through openings therefor in the insulator and cover and into the guide slots 15 and 16 as shown in FIGURES 9 and 11.

Figure 11:
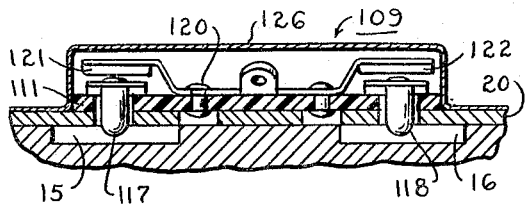
FIGURE 11 is a transverse sectional view taken substantially on line 11—11 of FIGURE 10 illustrating additional details of the switch means.

A member 119 is also secured to the upper side of the insulator by rivets 120 and this member includes a pair of yieldable offset ends having edge portions 121 and 122 which are normally respectively spaced apart from the offset legs 115 and 116 as shown in FIGURE 11. The U-shaped member and member 119 are thus normally insulated from one another. The U-shaped member is connected to the battery 110 by a conductor 123 and member 119 to the lamp by a conductor 124. The lamp is grounded by a conductor 125 for return to the battery.

With this organization inward movement of the actuator 18 to a locked position will cause the actuator to engage the button 117 and raise the yieldable leg 115 to cause its engagement with the edge 121 of an end of member 119 and thereby place the lamp in circuit. When the other actuator 19 is moved to a locked position the button 118 will cause engagement of the other end of member 119 with the edge 122 on the leg 116 to illuminate the lamp. Obviously, both actuators can be simultaneously actuated to operate the signal, and provision could be made to render a signal when the actuator 17 is actuated. A cover 126 is preferably disposed over the switch means and secured to the cover by screws 127.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. A valve assembly comprising a moulded body having a side provided with a valve seat and another side having a planar portion, a plurality of passages extending from the valve seat, grooves provided in the planar portion joining the passages, a member sealed against the planar portion and forming with the grooves additional passages, and a valve mounted on the valve seat and provided with recesses for operatively connecting the passages extending from the valve seat as desired.

2. A valve assembly comprising a relatively thin flat body having an upper side and a bottom surface, said upper side being provided with a seat, a first passage extending from the seat for connection with a means responsive to the flow of fluid, a second passage extending from the seat, a third passage for connection with a source of fluid power, a groove intersecting the bottom surface of the body and joining the second and third passages, and a plate secured in sealed relationship to the bottom surface of the body and forming with the groove an additional passage so that fluid may circulate therethrough between the second and third passages, the arrangement being such that a valve when mounted on the seat may be utilized to connect the first and second passages.

3. A valve assembly comprising a body provided with a recess having a bottom wall serving as a seat and passages leading to the seat, said body also being provided with a groove communicating with the periphery of the seat, a valve disposed within the confines of the recess and bearing against the seat, said valve being provided with means for connecting the passages, an elongate actuator having its inner end disposed in the groove and overlying and resting on the valve element, said actuator being connected for operating the valve, a cover secured to the body and overlying the actuator for holding the actuator in its groove so the actuator will in turn hold the valve in its recess, and a support extending from the body and supporting the actuator at a location spaced from the body.

4. A valve assembly comprising a body provided with a first recess having a bottom wall serving as a seat, said body also being provided with a second recess and passages leading to the seat, a valve disk disposed within the confines of the first recess and bearing against the seat, said valve disk being provided with means for connecting the passages, an elongate actuator having its inner end disposed in the second recess and overlying the valve disk, said actuator being connected to the valve for operating the valve, and a cover secured to the body and overlying the actuator for holding the actuator in its recess so the actuator will in turn hold the valve in its recess.

5. A multiple valve structure comprising a body having at least one flat face, said flat face being formed with a plurality of circular recesses, each recess having a flat bottom, said body being formed with passages communicating with the bottom of each of said recesses, there being a trunk-line conduit communicating with corresponding of said passageways of each of said recesses, a valve disk oscillatably seated in each recess, said face being further formed tangentially to each of said recesses with an elongate groove extending to a common edge of said body for providing a guideway for an actuator, an elongate actuator disposed in each of said guideways, each actuator having one end portion overlying and connected to an edge of its respective valve disk for oscillating the same and the opposite end of each actuator projecting beyond said body, and a cover secured to said body and overlying said actuators for retaining the latter in their respective guideways.

6. The structure as defined in claim 5 wherein the connection between each actuator and its respective valve disk includes a slot formed in and transverse to the portion of the actuator overlying said valve disk, and a finger fixed to the disk and engaged in said slot.

7. A multiple-valve structure comprising a body having at least one flat face, said flat face being formed with a plurality of circular recesses, each recess having a flat bottom, said body being formed with trunk-line inlet and outlet passages communicating with the bottom of each of said recesses and also formed with a second set of passages leading from said bottom for communication with a responsive means, a valve disk seated in each recess, the bottom face of each of said disks being formed with two arcuate grooves for selectively establishing communication between said passages, said face being further formed tangentially to each of said recesses with an elongate recess extending to a common edge of said body for providing a guideway for an actuator, an elongate actuator disposed in each of said guideways, each actuator having one end portion overlying and connected to an edge of its respective valve disk for oscillating the same, the opposite end portion of each actuator projecting beyond said body, means actuated upon valve opening movement of any one or a plurality of actuators moved simultaneously for closing the remaining valves, and a cover secured to said body and overlying said actuators for retaining the latter in their respective guideways.

8. A multiple-valve structure comprising an elongate flat body, one face of said body being formed with a row of circular recesses arranged lengthwise thereof, each recess having a flat bottom, the opposite face of said body being formed with a pair of grooves each communicating through bores with the bottom of each of said recesses, a plate secured over said last-mentioned face of said body and sealing said grooves to define inlet and outlet trunk lines to said recesses, the bottom of each recess being further formed with passages for establishing communication with connecting lines to a responsive device, a valve disk oscillatably seated in each recess, said first-mentioned face being further formed tangentially to each of said recesses with an elongate recess of less depth than said first recesses and extending to a common edge of said body for providing a guideway for an actuator, an elongate actuator disposed in each of said guideways, each actuator having one end portion overlying and connected to an edge of its respective valve disk for actuating the same and the opposite end of each actuator projecting beyond said body, and a cover secured to said body and overlying said actuators for retaining the latter in their respective guideways.

9. A valve structure comprising a body having at least one flat-bottomed recess formed in one face thereof, said body being formed with passages communicating with the bottom of said recess, a flexible valve disk oscillatably seated in said recess, the lower face of said disk being grooved for selectively establishing communication with said passages, a stiff backing plate overlying said disk and keyed thereto, said body being further formed tangentially to said recess with an elongate groove extending to an edge of said body for providing a guideway for an actuator, an elongate actuator disposed in said guideway, said actuator having an end portion overlying said plate and connected to an edge portion thereof, the opposite end portion of the actuator projecting beyond said body, and a cover secured to said body and overlying said actuator for retaining the actuator in its groove and the valve against its seat.

10. The structure as defined in claim 9 wherein the connection between said valve disk and actuator includes a slot formed in the portion of said actuator overlying said valve disk and extending radially of said recess, and a finger carried by said overlying plate and engaged in said slot.

11. A valve assembly comprising a body provided with a recess having a flat bottom serving as a seat, there being passageways leading to said seat, said body also being formed with a groove communicating with a peripheral portion of said recess, a valve disk disposed within said recess and bearing against said seat, said disk being provided with means for connecting said passages, an elongate actuator having one end disposed in said groove and having a portion of said one end overlying and resting upon said disk, said actuator being operatively connected to said disk to shift the same, and a cover secured to said body and overlying said actuator for holding said actuator in its groove so that the actuator will in turn hold said disk in its recess.

References Cited in the file of this patent

UNITED STATES PATENTS

| | | |
|---|---|---|
| 1,055,092 | Smith | Mar. 4, 1913 |
| 1,055,781 | Mitchell et al. | Mar. 11, 1913 |
| 1,273,142 | Brosius | July 23, 1918 |
| 1,298,227 | Landis | Mar. 25, 1919 |
| 1,336,084 | Landis | Apr. 6, 1920 |
| 2,042,186 | Peterson | May 26, 1936 |
| 2,076,321 | Pick | Apr. 6, 1937 |
| 2,202,960 | Parker | June 4, 1940 |
| 2,202,961 | Parker | June 4, 1940 |
| 2,351,732 | Almond et al. | June 20, 1944 |
| 2,406,246 | Ogden | Aug. 20, 1946 |
| 2,540,420 | Bordelon | Feb. 6, 1951 |
| 2,696,805 | Krohm | Dec. 14, 1954 |
| 2,878,833 | Krohm | Mar. 24, 1959 |
| 2,881,462 | Oishei | Apr. 14, 1959 |